United States Patent
Neil et al.

[19]
[11] Patent Number: 5,942,352
[45] Date of Patent: *Aug. 24, 1999

[54] RADIO TELEPHONE BATTERY PACK

[75] Inventors: Gary Neil; Karim Bacchus, both of Hampshire, United Kingdom

[73] Assignee: Nokia Mobile Phones Limited, Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/786,850

[22] Filed: Jan. 22, 1997

[30] Foreign Application Priority Data

Jan. 31, 1996 [GB] United Kingdom ............... 9601943

[51] Int. Cl.$^6$ .................................................. H01M 2/10
[52] U.S. Cl. ........................ 429/96; 429/163; 429/186
[58] Field of Search ................... 429/96–100, 4, 429/186, 208, 66, 163

[56] References Cited

U.S. PATENT DOCUMENTS

| | | | |
|---|---|---|---|
| 4,123,598 | 10/1978 | Hammel | 429/159 |
| 4,125,681 | 11/1978 | Sjogren | 429/99 |
| 4,265,984 | 5/1981 | Kaye | 429/178 |
| 4,407,911 | 10/1983 | Hooke | 429/94 |
| 4,939,047 | 7/1990 | Nagashima | 429/66 |
| 4,945,633 | 8/1990 | Hakanen et al. | 29/825 |
| 5,036,432 | 7/1991 | Uronen et al. | 361/422 |
| 5,045,973 | 9/1991 | Saarela et al. | 361/395 |
| 5,149,602 | 9/1992 | Savovic et al. | 429/96 |
| 5,196,280 | 3/1993 | Gyenes | 429/144 |
| 5,308,716 | 5/1994 | Shababy et al. | 429/97 |
| 5,323,150 | 6/1994 | Tuttle | 429/98 X |
| 5,432,017 | 7/1995 | Hassemer et al. | 429/4 |
| 5,466,545 | 11/1995 | Chamberlain et al. | 429/99 |

FOREIGN PATENT DOCUMENTS

WO 95/08848  3/1995  WIPO .

*Primary Examiner*—Stephen Kalafut
*Attorney, Agent, or Firm*—Perman & Green, LLP

[57] ABSTRACT

A battery pack for a portable handset comprises two casing parts 10, 12 ultrasonically welded together and enclosing a cell pack 14. The internal surface of one casing part 10 is integrally moulded with an array of projecting pips 18 which, on assembly of the pack are partially crushed to take up dimensional tolerances between the casing parts 10, 12 and the cell pack 14. This retains the cell pack 14 firmly in position between the casing parts 10, 12.

9 Claims, 2 Drawing Sheets

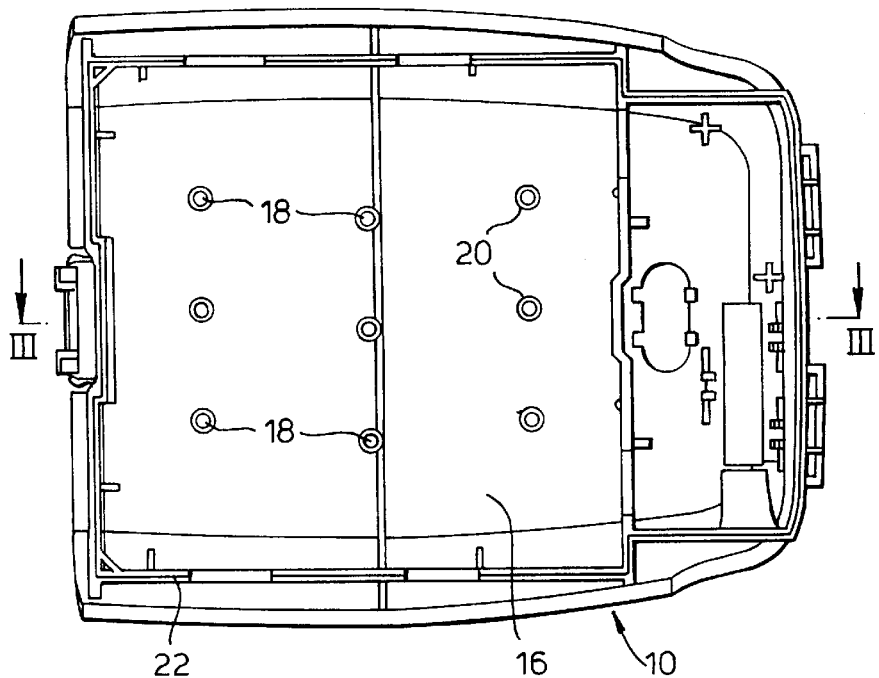
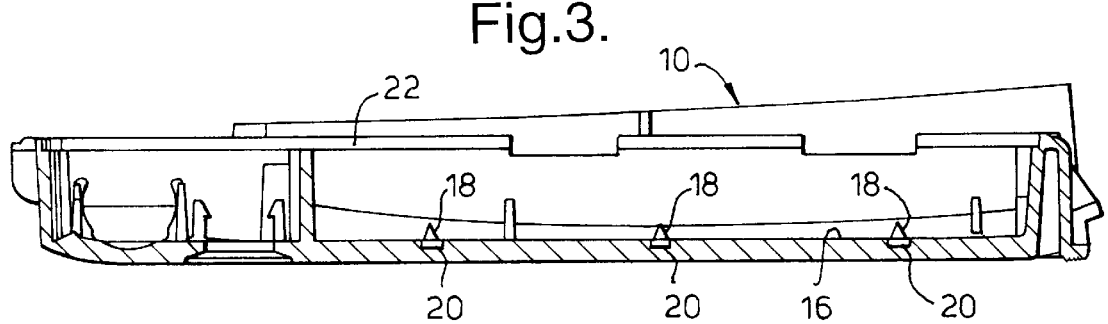
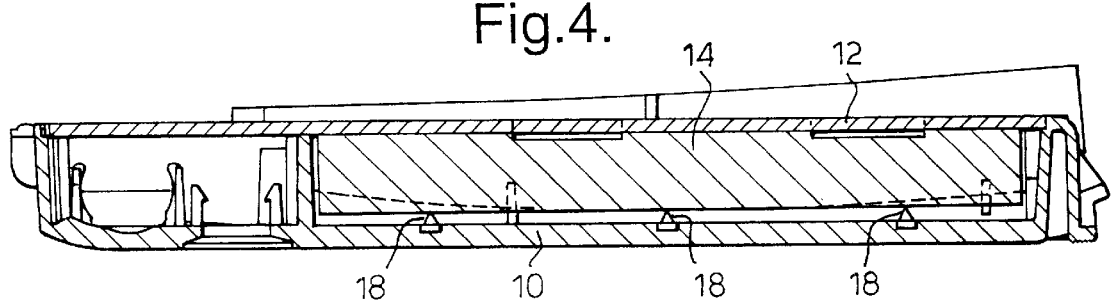

RADIO TELEPHONE BATTERY PACK

BACKGROUND OF THE INVENTION

This invention relates to a battery pack for a radio telephone in the form of a portable handset. The battery pack is detachably secured on the remainder of the portable handset, being detachable therefrom for replacement or charging.

A known battery pack comprises a plastics casing having two interconnected, casing parts retaining therebetween a pack of rechargeable nickel/cadmium cells. The cell pack is fairly heavy in relation to the casing parts and the individual cells have metal casings which are substantially rigid. The cell pack thus tends to move about within the plastics casing unless the cell pack is firmly held between the two casing parts. Such firm retention can be difficult to achieve because there can be an adverse accumulation of dimensional tolerances in the sizes of the casing parts, resulting in the cell pack being received with clearance in the space between the casing parts. Hitherto, this problem has been solved by applying adhesives or resilient spacers to one or more of the plastics casing parts, but this solution is not only expensive and complicated but it is also unacceptable because it renders the plastics casing parts unsuitable for recycling.

SUMMARY OF THE INVENTION

According to the invention a battery pack for a radio telephone in the form of a portable handset comprises two casing parts secured together and enclosing a cell pack positioned between the two casing parts, wherein one of the casing parts has a plurality of localised projections which are deformed by being crushed against an adjacent surface of the cell pack, in order to accommodate dimensional tolerances between the casing parts and the cell pack. Preferably, the projections are pips projecting from an internal surface of said one casing part which may be of a synthetic plastics material with the pips integrally moulded thereon.

BRIEF DESCRIPTION OF THE DRAWINGS

A battery pack for a radio telephone will now be described, by way of example, with reference to the accompanying drawings in which:

FIG. 2 is a plan view of one of the casing parts of the battery pack, FIG. 3 is a sectional view, to an enlarged scale, on the line III—III of FIG. 2, and FIG. 4 is a sectional view of the assembled battery pack to the same scale as that of FIG. 3 and on a section line corresponding to that of FIG. 3.

DETAILED DESCRIPTION OF THE INVENTION

Figure 1:
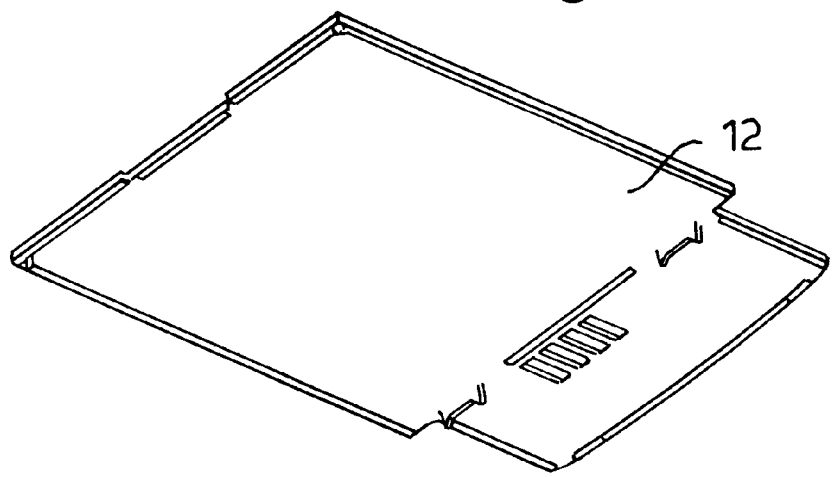
FIG. 1 is an isometric view of the main parts of the battery pack in exploded view.
Figure 1:
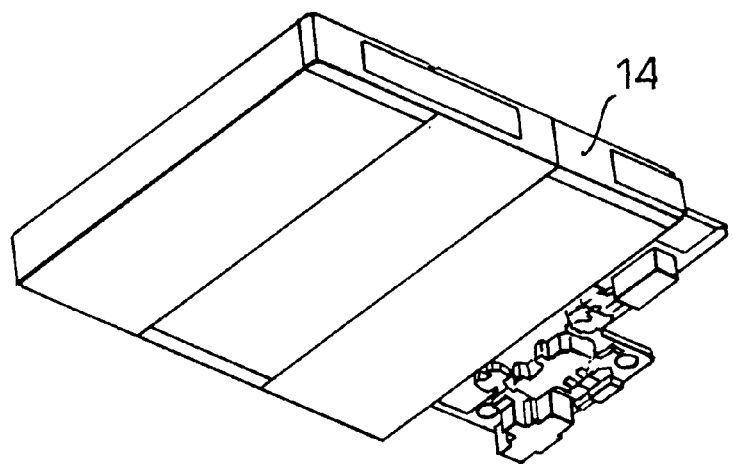
Figure 1:
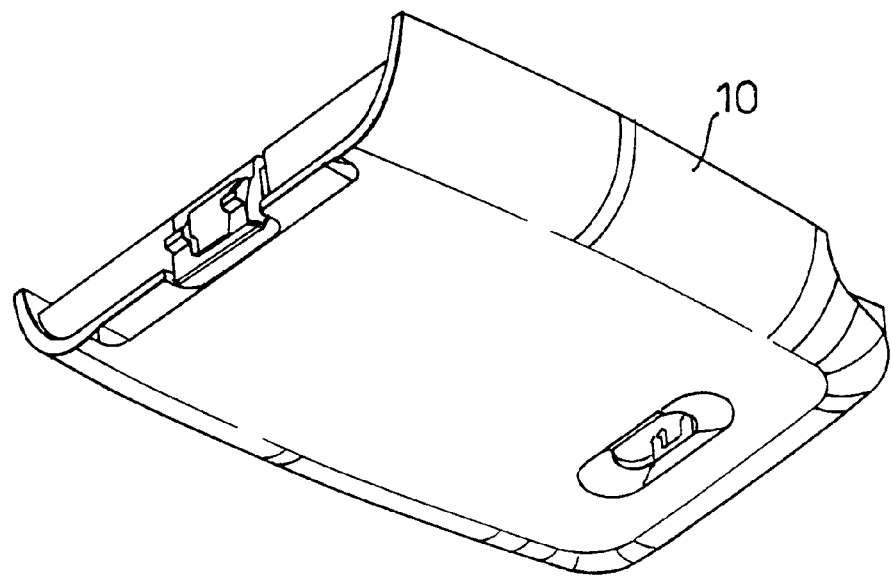

Referring to FIG. 1, the battery pack comprises two plastics casing parts, namely a recessed first part 10 and a lid-like second part 12. The two casing parts enclose between them a cell pack 14 comprising three rechargeable nickel cadmium cells in series. The casing part 12 has apertures for electrical contact to be made with the cells.

The casing part 10 is shown in plan view in FIG. 2 and in sectional view in FIG. 3. The recessed base 16 of the casing part 10 has formed thereon an array of upwardly projecting and integrally moulded pips 18, in this case there being nine pips 18 arranged in three rows each of three pips as shown in FIG. 2. Each pip is of conical shape, converging upwardly to a point which stands about 1.2 mm above the surface of the base 16 of the casing part 10. The base 16 is recessed in an annular area around the base of each pip 18, these recessed areas appearing as the annular areas 20 visible in FIG. 2.

The battery pack is assembled by orienting the casing part 10 with its recess facing upwardly (as in FIG. 1), locating the cell pack 14 in the recess in the casing part 10 so that the metal undersurface of the cell pack engages the pips 18, placing the other casing part 12 on a ledge 22 formed on the casing part 10 and ultrasonically welding the casing parts 10 and 12 together. The ultrasonic welding step is accompanied by pressure (applied to the casing parts) which deforms the tops of the pips 18 to an extent dependent on the dimensional tolerance to be taken up between the casing parts 10, 12 and the cell pack 14. This tolerance is normally of the order of + or − 0.25 mm, ie a maximum variation of 0.5 mm.

After the two casing parts 10, 12 have been ultrasonically welded together, the pips 18 are partially deformed as shown in the sectional view in FIG. 4. The annular recess 20 around the base of each pip 18 accommodates deformed pip material which can pass into this recess as a result of cold flow of the plastics material on deformation. The ultrasonic welding does not itself affect the pips which are deformed as a result of the pressure applied between the casing parts during ultrasonic welding.

At the end of the life of the battery pack, the casing parts 10, 12 are separated from the cell pack 14. The casing parts 10, 12, being uncontaminated plastics, can be recycled in an appropriate way, as can the battery pack 14.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A battery pack for a radio telephone in the form of a portable handset, the battery pack comprising:

a casing having a first and a second part that are securable together with a space formed between opposing inner surfaces thereof for enclosing a cell pack therebetween; and a plurality of projections on one of said inner surfaces for engaging said cell pack, said projections being of a material that is readily deformable by crushing under pressure and dimensioned to be crushed when said first and second parts are secured together in order to take up dimensional tolerances between the casing parts and the cell pack to hold the cell pack securely in place within said space.

2. A battery pack according to claim 1, wherein the projections are pips projecting from the internal surface of said one casing part.

3. A battery pack according to claim 2, wherein said one casing part is of a synthetic plastics material and the pips are integrally moulded with the remainder of said one casing part.

4. A battery pack according to claim 2, wherein the internal surface of said one casing part is recessed in a localised area around the base of each pip.

5. A battery pack according to claim 3, wherein each pip is of conical shape before deformation.

6. A battery pack according to claim 1, wherein the casing parts are or a synthetic plastics material and are secured together by ultrasonic welding.

7. A battery pack as defined in claim 1 made by the process of providing an opposing face on said other casing part absent any deformable projections and applying pressure to the cell pack through the projections to press the cell pack against said opposing face.

8. A battery pack for a radio telephone in the form of a portable handset, the battery pack comprising two casing parts each having an inner surface facing the other to define a space of a given depth therebetween when secured together, said casing parts enclosing a cell pack of a given depth positioned within said space between the two casing parts, wherein one of the casing parts inner surface has a plurality of localized deformable projections and the other casing part inner surface has an opposing face absent any such projections, said deformable projections being of a material that is readily deformable by crushing under pressure and dimensioned to be crushed relative to said given depth of said space and of said cell pack when said first and said second parts are secured together, said projections being crushed against an adjacent inner surface of the cell pack when said two casing parts are secured together, in order to take up dimensional tolerances between the casing parts and the cell pack when the two casing parts are secured together and when pressure is applied to the cell pack through the projections to press the cell pack against said opposing inner surface.

9. A method of immovably securing a cell pack within a casing for a radio telephone in the form of a portable handset, comprising the steps of:

providing a casing having a first and a second part that are securable together within a space formed between opposing inner surfaces thereof for enclosing a cell pack therebetween;

providing a plurality of projections on one of said inner surfaces for engaging said cell pack;

providing said projections of a material that is readily deformable by crushing under pressure and dimensioned to be crushed when said first and second parts are secured together; and causing said projections to be crushed by securing said first and second parts together in order to take up dimensional tolerances between the casing parts and the cell pack to hold the cell pack securely in place within said space.

* * * * *